United States Patent
Smith et al.

(10) Patent No.: US 8,724,300 B2
(45) Date of Patent: May 13, 2014

(54) MECHANICALLY ATTACHED FOLDING COVER

(75) Inventors: Dustin Jonathan Smith, Kitchener (CA); Anders Fahrendorff, Ottawa (CA); Todd Andrew Wood, Toronto (CA); Ian James Murchison, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 209 days.

(21) Appl. No.: 13/404,444

(22) Filed: Feb. 24, 2012

(65) Prior Publication Data

US 2013/0223005 A1    Aug. 29, 2013

(51) Int. Cl.
*G06F 1/16*    (2006.01)

(52) U.S. Cl.
CPC ................................ *G06F 1/1628* (2013.01)
USPC ...................... 361/679.01; 206/320

(58) Field of Classification Search
USPC .............................. 361/679.55; 206/701, 722
See application file for complete search history.

(56) References Cited

U.S. PATENT DOCUMENTS

| | | | |
|---|---|---|---|
| 1,889,420 A | | 12/1930 | Rubicam, Jr. |
| 4,259,568 A | * | 3/1981 | Dynesen ........................ 235/1 D |
| 4,918,632 A | * | 4/1990 | York ........................ 361/679.09 |
| 5,607,054 A | * | 3/1997 | Hollingsworth .............. 206/320 |
| 5,682,993 A | * | 11/1997 | Song ............................. 206/320 |
| 5,701,230 A | * | 12/1997 | Liang et al. .............. 361/679.27 |
| 5,835,344 A | * | 11/1998 | Alexander ............... 361/679.46 |
| 5,887,723 A | * | 3/1999 | Myles et al. .................. 206/760 |
| 6,222,728 B1 | * | 4/2001 | Jaggers et al. ........... 361/679.41 |
| 6,356,440 B2 | * | 3/2002 | Selker ....................... 361/679.55 |
| 6,967,836 B2 | * | 11/2005 | Huang et al. ............. 361/679.46 |
| 7,031,148 B1 | * | 4/2006 | Lin ........................... 361/679.08 |
| 7,191,926 B1 | * | 3/2007 | Costantino et al. ........... 224/605 |
| 7,236,356 B2 | * | 6/2007 | Ulla et al. ................ 361/679.21 |
| D606,302 S | | 12/2009 | Fahrendorff et al. |
| D606,303 S | | 12/2009 | Fahrendorff et al. |
| D606,528 S | | 12/2009 | Khan et al. |
| D606,529 S | | 12/2009 | Ferrari et al. |
| D606,530 S | | 12/2009 | Ferrari et al. |
| D606,531 S | | 12/2009 | Ferrari et al. |
| D606,739 S | | 12/2009 | Fahrendorff et al. |
| D606,740 S | | 12/2009 | Fahrendorff et al. |
| D607,444 S | | 1/2010 | Ferrari et al. |
| D607,445 S | | 1/2010 | Ferrari et al. |
| D607,446 S | | 1/2010 | Ferrari et al. |
| D607,447 S | | 1/2010 | Ferrari et al. |
| D609,229 S | | 2/2010 | Ferrari et al. |
| D609,230 S | | 2/2010 | Ferrari et al. |
| D611,042 S | | 3/2010 | Ferrari et al. |

(Continued)

OTHER PUBLICATIONS

Trademark Smart Cover, U.S. Appl. No. 85/359,955, filed Jun. 29, 2011.

(Continued)

*Primary Examiner* — Lisa Lea Edmonds
(74) *Attorney, Agent, or Firm* — Fish & Richardson P.C.

(57) ABSTRACT

A mobile electronic device has a first part of a male/female coupling. A cover sized to cover at least one face of the mobile electronic device has a second part of the male/female coupling. The second part of the male/female coupling mates with the first part of the male/female coupling of the mobile electronic device and cooperates with the first part to attach the cover to the mobile electronic device.

14 Claims, 5 Drawing Sheets

(56) References Cited

U.S. PATENT DOCUMENTS

| | | | |
|---|---|---|---|
| D611,701 S | 3/2010 | Fahrendorff et al. | |
| D611,702 S | 3/2010 | Fahrendorff et al. | |
| D611,703 S | 3/2010 | Fahrendorff et al. | |
| D612,149 S | 3/2010 | Fahrendorff et al. | |
| D613,056 S | 4/2010 | Fahrendorff et al. | |
| D613,499 S | 4/2010 | Fahrendorff et al. | |
| D618,231 S | 6/2010 | Fahrendorff et al. | |
| 7,735,644 B2* | 6/2010 | Sirichai et al. | 206/320 |
| D620,258 S | 7/2010 | Fahrendorff | |
| D620,259 S | 7/2010 | Fahrendorff et al. | |
| D620,704 S | 8/2010 | Fahrendorff et al. | |
| D621,618 S | 8/2010 | Fahrendorff et al. | |
| D627,770 S | 11/2010 | Ferrari et al. | |
| 7,826,219 B2* | 11/2010 | Chien et al. | 361/679.55 |
| D630,839 S | 1/2011 | Fahrendorff et al. | |
| D632,072 S | 2/2011 | Fahrendorff et al. | |
| D632,288 S | 2/2011 | Fahrendorff et al. | |
| D632,289 S | 2/2011 | Fahrendorff et al. | |
| D632,682 S | 2/2011 | Fahrendorff et al. | |
| D633,485 S | 3/2011 | Fahrendorff et al. | |
| D633,486 S | 3/2011 | Fahrendorff et al. | |
| D634,314 S | 3/2011 | Fahrendorff et al. | |
| D635,763 S | 4/2011 | Fahrendorff et al. | |
| D636,769 S | 4/2011 | Wood et al. | |
| D638,216 S | 5/2011 | Fahrendorff et al. | |
| D641,012 S | 7/2011 | Fahrendorff et al. | |
| D645,659 S | 9/2011 | Fahrendorff et al. | |
| D648,520 S | 11/2011 | Fahrendorff et al. | |
| D648,523 S | 11/2011 | Fahrendorff et al. | |
| D648,524 S | 11/2011 | Fahrendorff et al. | |
| D648,536 S | 11/2011 | Fahrendorff et al. | |
| D648,717 S | 11/2011 | Fahrendorff et al. | |
| D652,031 S | 1/2012 | Fahrendorff et al. | |
| D652,208 S | 1/2012 | Fahrendorff et al. | |
| D652,827 S | 1/2012 | Fahrendorff et al. | |
| D652,828 S | 1/2012 | Fahrendorff et al. | |
| D653,033 S | 1/2012 | Fahrendorff et al. | |
| D653,248 S | 1/2012 | Fahrendorff et al. | |
| D653,249 S | 1/2012 | Fahrendorff et al. | |
| D653,657 S | 2/2012 | Fahrendorff et al. | |
| D653,658 S | 2/2012 | Fahrendorff et al. | |
| D653,659 S | 2/2012 | Fahrendorff et al. | |
| 8,310,826 B2* | 11/2012 | Wu et al. | 361/679.3 |
| 8,328,008 B2* | 12/2012 | Diebel et al. | 206/45.24 |
| 8,355,248 B2* | 1/2013 | Nishi | 361/679.55 |
| 8,416,568 B2* | 4/2013 | Tian et al. | 361/679.55 |
| 8,472,168 B2* | 6/2013 | Su | 361/679.01 |
| 8,477,493 B2* | 7/2013 | Wu et al. | 361/679.56 |
| 2004/0195146 A1* | 10/2004 | Lopez | 206/576 |
| 2006/0018089 A1* | 1/2006 | Chou | 361/683 |
| 2006/0226040 A1* | 10/2006 | Medina | 206/320 |
| 2006/0285283 A1* | 12/2006 | Simonian et al. | 361/679 |
| 2007/0217129 A1* | 9/2007 | Chuang et al. | 361/679 |
| 2008/0029412 A1* | 2/2008 | Ho et al. | 206/320 |
| 2010/0110629 A1* | 5/2010 | Dietz et al. | 361/679.55 |
| 2010/0122924 A1* | 5/2010 | Andrews | 206/320 |
| 2011/0090626 A1 | 4/2011 | Hoellwarth et al. | |
| 2011/0122553 A1* | 5/2011 | Griffin et al. | 361/679.01 |
| 2012/0044638 A1* | 2/2012 | Mongan et al. | 361/679.55 |
| 2012/0194448 A1* | 8/2012 | Rothkopf | 345/173 |
| 2012/0218699 A1* | 8/2012 | Leung et al. | 361/679.08 |

OTHER PUBLICATIONS

DODOcase, http://www.dodocase.com/collections/dodocase, Feb. 13, 2012 (6 pages).

Targus Zierra Leather Portfolio for iPad 1 & 2, http://www.targus.com/us/productdetail.aspx?regionId=7&sku=THZ062US&PageName=, Feb. 14, 2012 (4 pages).

Koolertron Black Built-in Bluetooth Keyboard Leather Housing Carry Case Cover for Apple iPad2 iPAD 2 2nd, http://www.amazon.com/Koolertron-Bluetooth-Keyboard-Leather-Housing/dp/B004T6P1, Feb. 14, 2012 (6 pages).

Targus Versavu Case & Stand for iPad 2, http://www.targus.com/us/productdetail.aspx?regionId=7&sku=THZ045US&PageName=, Feb. 14, 2012 (7 pages).

Acase iPad 2 EZ-Carry Polyurethane Case (Ultra Slim) Folio Stand for Apple iPad2 2nd Generation WiFi/3G, http://www.amazon.com/Acase-EZ-Carry-Polyurethane-ULTRA-Generation/.../ref=sr_1, Feb. 14, 2012 (7 pages).

Bear Motion Genuine Leather Case for iPad2 2nd Generation built-in Stand for Apple Ipad2 (Latest Generation) Tablet, http://www.amazon.com/Bear-Motion-Genuine-Leather-Generation/dp/B004Q7KTF4/ref=sr_1_4?ie=UTF8&qid=1329255634&sr=8-4, Feb. 14, 2012 (10 pages).

Toblino 2: Leather iPad 2 Case (Folio Convertable Multi-angle Stand for Apple iPad2 or iPad2 3G), http://www.amazon.com/Toblino-Leather-Folio-Convertable-Multi-angle/dp/B004TM1JBE/ref=sr_1_14?ie=UTF8&qid=1329255634&sr=8-14, Feb. 14, 2012 (6 pages).

* cited by examiner

MECHANICALLY ATTACHED FOLDING COVER

BACKGROUND

A mobile electronic device can be a tablet computer, cellular phone, including a smart phone, a dedicated personal digital assistant (PDA) with or without phone or data capabilities, an electronic reading device, a digital media player, or any other mobile device. In many instances, the terms "mobile device," "hand held device" and "hand set" are interchangeable, both regarding to electronic devices available as information stores for personal contacts, calendar appointments, and the like. Since users often carry their mobile electronic devices with them throughout the day, the most popular covers for containing and protecting the devices are those that are compact and easy to use. Insecure or loose fitting covers interfere with the usability of the device, as do bulky covers.

DESCRIPTION OF DRAWINGS

Like reference symbols in the various drawings indicate like elements.

DETAILED DESCRIPTION

Figure 1:
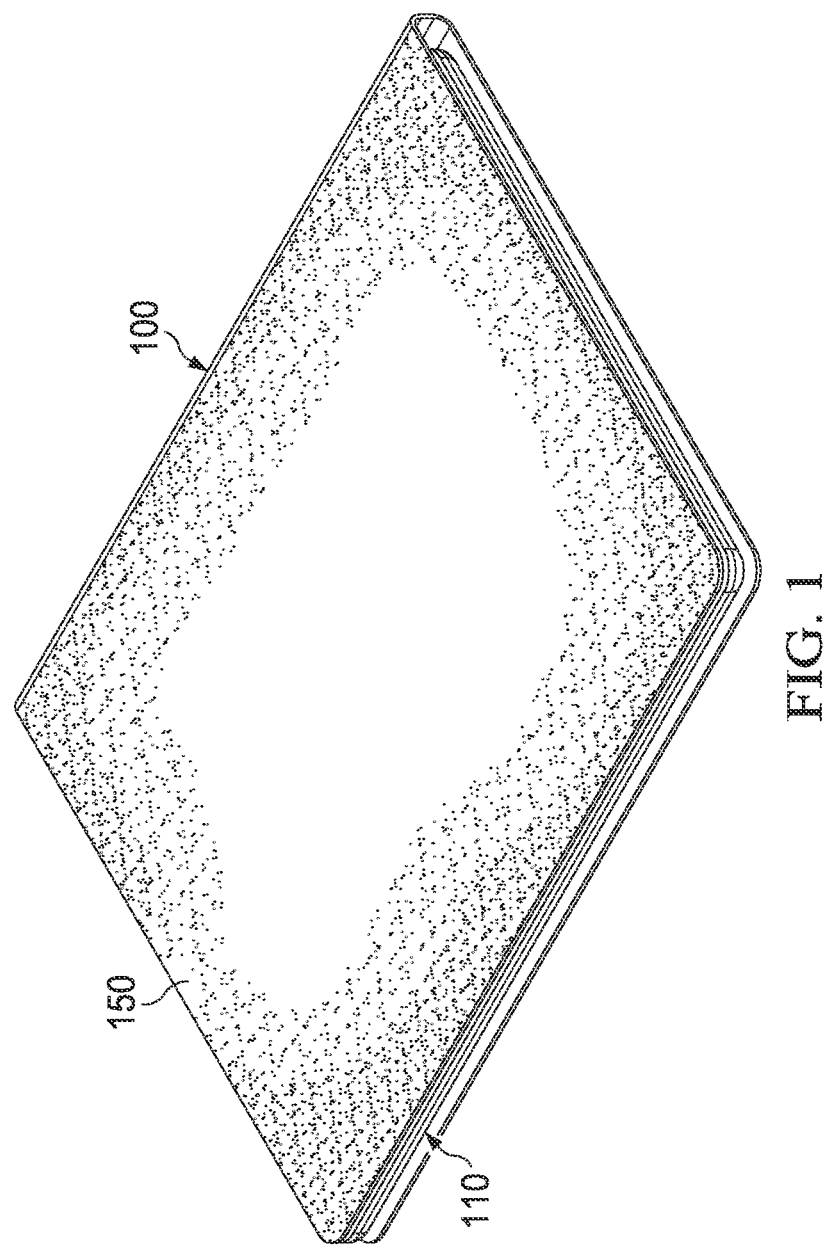
FIG. 1 is a perspective view of an example cover for a mobile electronic device with the cover shown closed and the mobile electronic device inside.
Figure 2:
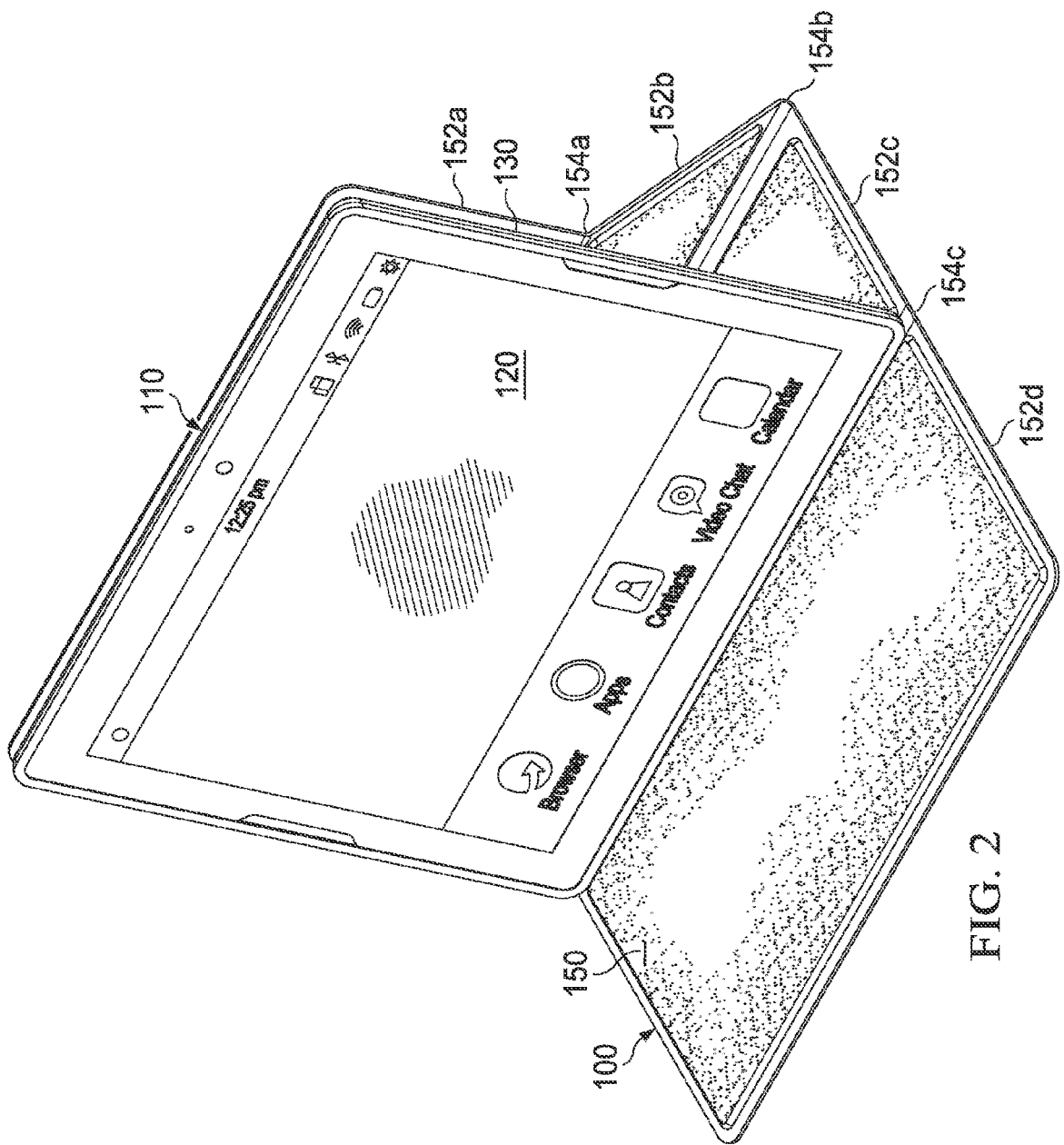
FIG. 2 is a perspective view of the cover of FIG. 1 with the cover shown open and propped in a near upright position for viewing the mobile electronic device.

FIG. 1 is a perspective of an example cover 100 for a mobile electronic device 110 with the cover shown closed and the mobile electronic device 110 inside. FIG. 2 is a perspective view of the cover 100 shown open and propped in a near upright position. The example cover 100, a folio type cover, is but one example of a number of different forms of covers that the concepts herein can be applied to. For example, the cover can take the form of a case, a skin, a holster, a pocket, a sleeve, a slip case, an envelope, and/or another form. As will be described in more detail below, the cover 100 has a body portion 150 adapted to cover (substantially or entirely) at least one face of the mobile electronic device 110. The body portion 150 includes a part of a male/female coupling that mates with a corresponding part of the male/female coupling of the mobile electronic device 110. The parts cooperate to attach the cover 100 to the mobile electronic device 110.

The mobile electronic device 110 can be hand held and can be a tablet computer, a cellular phone, including a smart phone, a dedicated personal digital assistant (PDA) with or without phone or data capabilities, an electronic reading device, a digital media player, or any other mobile device. In many instances, the terms "mobile device," "hand held device" and "hand set" are interchangeable, regarding to electronic devices available as information stores for personal contacts, calendar appointments, and the like. The mobile device can have a battery, enabling the device to be operated without a power cord. Additionally, many mobile devices wirelessly connect to the public Internet to allow for the sending and receiving of e-mail. Such mobile devices may also provide more general Internet access, such as access to the World Wide Web. For example, the mobile device 110 may be designed to operate with the General Packet Radio Service (GPRS) mobile data communication networks and may also be designed to operate with any of a variety of voice communication networks, such as AMPS, TDMA, CDMA, PCS, GSM, etc. Other types of data and voice networks, both separate and integrated, may also be utilized with the mobile device 110.

In certain instances, the mobile device 110 is a two-way RF communication device having voice and data communication capabilities. In addition, the mobile device 110 can have the capability to communicate with other mobile devices or computer systems via the Internet.

The mobile device 110 includes a front panel 120 with a screen that defines the front face of the mobile device 110. The front panel 120 is planar (substantially or entirely). A back panel 130 (shown in FIG. 2) is attached to the back side of the front panel, and defines a back face of the mobile device 110. The back panel 130 is planar (substantially or entirely). The front panel 120 cooperates with the back panel 130 to house inner components of the mobile device 110.

The screen can be both an input device (i.e., a touch sensitive device) and an output device (i.e., a display). In some embodiments, the screen is a light emitting diode (LED) backlit liquid crystal display (LCD) with multi-touch control functions. Some of these features may be omitted in other examples. For example, the screen may lack the multi-touch control functions, or the screen may lack the LED backlit feature. In some embodiments, the mobile device 110 may include additional features, such as a front and/or rear camera.

Figure 3:
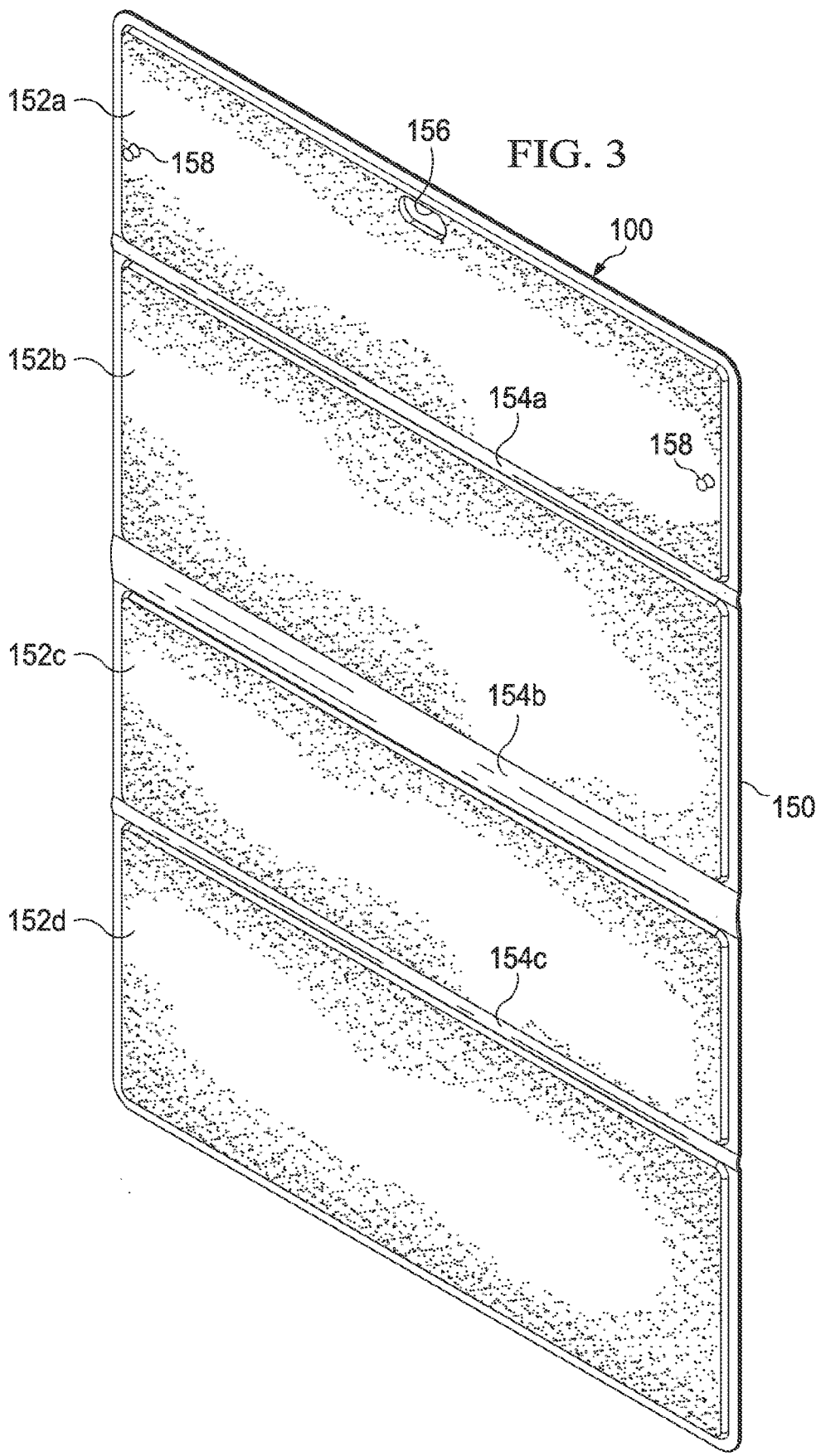
FIG. 3 is a perspective view of the cover of FIG. 1 with the cover shown apart from a mobile electronic device.
Figure 5:
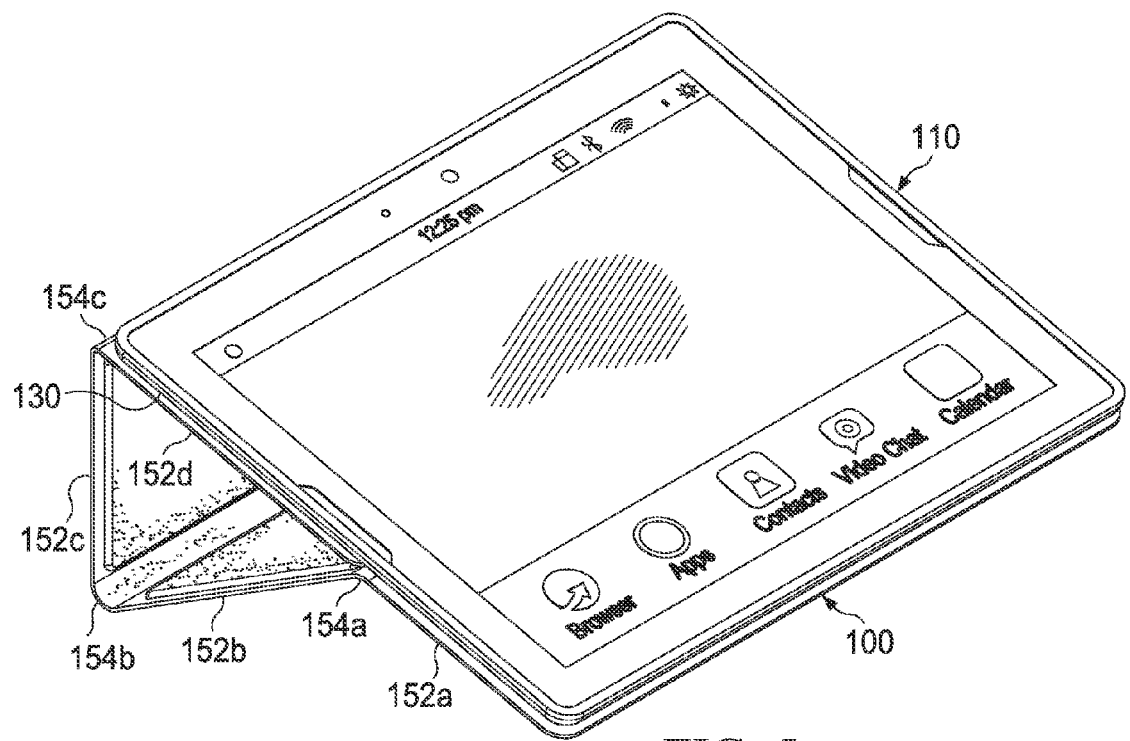
FIG. 5 is a perspective view of the cover of FIG. 1 with the cover shown open and propped in a screen typing position for viewing and typing on the mobile electronic device.
Figure 6:
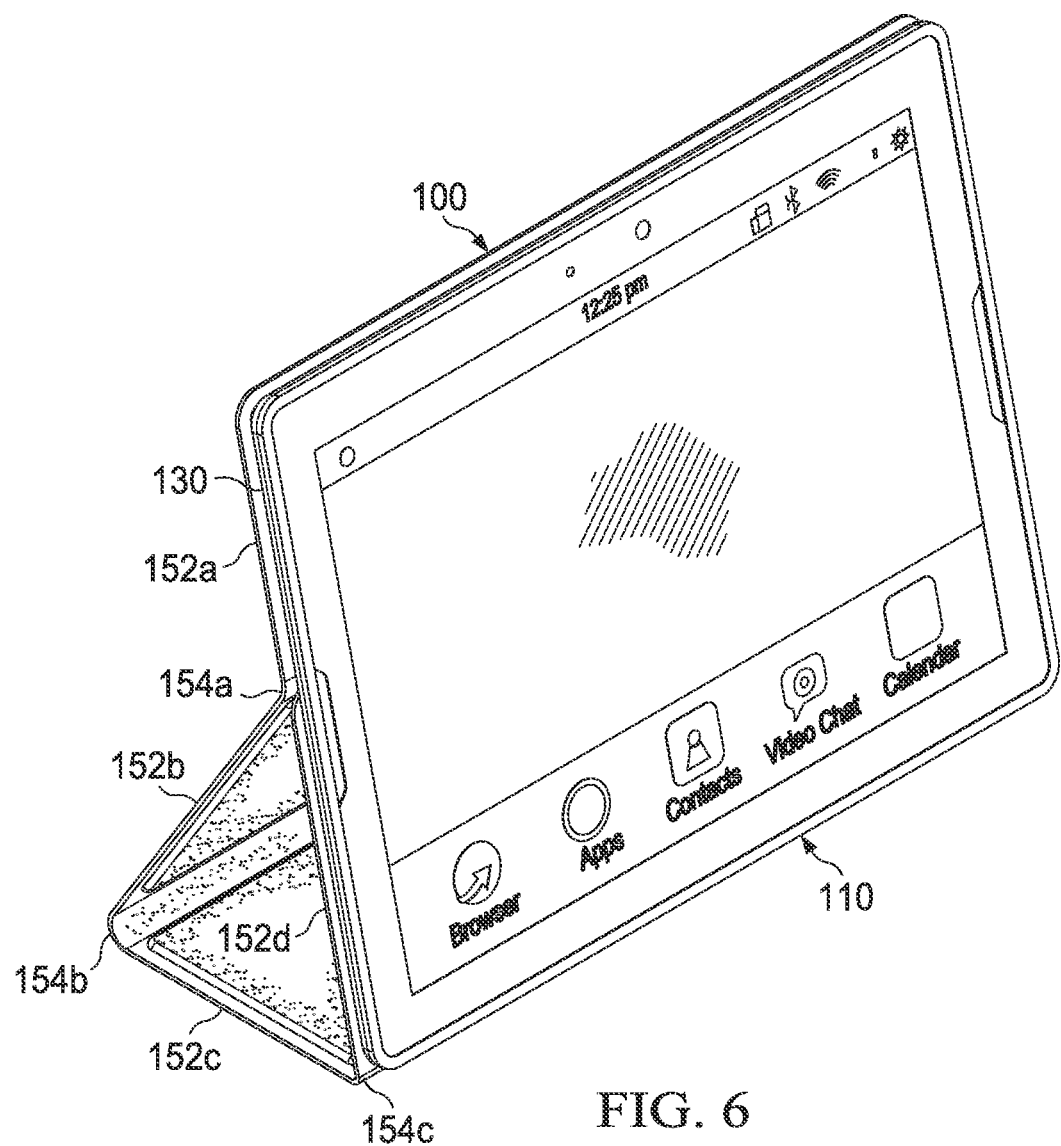
FIG. 6 is a perspective view of the cover of FIG. 1 with the cover shown open and propped in an alternate near upright position for viewing the mobile electronic device.

The example cover 100 is made as a single, continuous piece, but could be made as multiple pieces. As seen in FIG. 3, the cover 100 is thin and initially flat, and can be folded around the mobile electronic device 110 to cover the front and/or back face (FIG. 1) or manipulated into different shapes to prop the mobile electronic device 110 at different viewing angles (FIGS. 2, 5 and 6). The cover 100 can have various features, including an aperture 156 that allows the camera of the mobile electronic device 110 to see through the cover 100 when the cover 100 is installed to the mobile electronic device 110.

The body portion 150 can be made of one or more rigid sections hinged together. FIG. 3 shows four rigid sections 152a-152d hinged together by webs 154a-154c of flexible material. In certain instances, the rigid sections 152a-152d are molded, glass fiber panels filled with a polymer fiber material. However, the rigid sections 152a-152d could be made in a different manner. The flexible material of the webs 154a-154c is a covering material that covers the body portion 150, including the rigid sections 152a-152d. In certain instances, this covering material is polyurethane, leather and/or another material. The rigid sections 152a-d are thicker than the webs 154a-c, and thus the webs 154a-c define recesses on a surface of the cover 100.

A first rigid section 150a carries a part 158 of at least one coupling that, as will be discussed in more detail below, cooperates with a corresponding part of the coupling carried by the mobile electronic device 110 to hold the first rigid section 150a flush against the back face and/or parallel (substantially or precisely) to the back face of the mobile electronic device 110. The coupling is a male/female coupling in that it has a male part that is received in a corresponding female part. FIG. 3 shows the first rigid section 150*a* having two male/female coupling parts 158, each for a separate male/female coupling, but fewer or more parts 158 (and correspondingly, male/female couplings) could be used. If two or more male/female couplings are provided, the multiple points of attachment operate to align the cover 100 with respect to the mobile electronic device 110. For example, two or more male/female couplings can operate to align one or more edges of the cover 100 parallel with (substantially or precisely) and/or flush with one or more edges of the mobile electronic device 110. Because of the male/female nature of the coupling, the male/female coupling does not disengage when loaded in shear as do wholly magnetic couplings. Additionally, the male/female coupling does not need any additional alignment or engagement features to achieve a secure attachment. The male/female coupling can be contained in the interior perimeter of the cover 100 rather than extend from the edges of the cover 100. The coupling also does not to engage the edges of the device 110. As a result, the coupling facilitates a compact cover 100.

A second rigid section 152*b* is hingedly coupled to the first rigid section 152*a* via a web 154*a*. The first and second rigid sections 152*a*, 152*b* are sized to cover (substantially or fully) the back face of the mobile electronic device 110. A third rigid section 152*c* is hingedly coupled to the second rigid section 152*b* by another web 154*b*, and a fourth rigid section 152*d* is hingedly coupled to the third rigid section 152*c* by yet another web 154*c*. The third and fourth rigid sections 152*c*, 152*d* are sized to cover (substantially or fully) the opposing face (i.e., front face) of the mobile electronic device 110. The third and fourth rigid sections 152*c*, 152*d* are positioned relative to the first and second rigid sections 152*a*, 152*b* to allow the cover 100 to fold around the mobile electronic device 110 and cover both the front and back face in a closed state as in FIG. 1. One or more magnets can be embedded in the cover 100, for example in the fourth section 152*d* and/or the third section 152*c*, with corresponding magnets in the mobile electronic device 110 to magnetically attract the cover 100 to the mobile electronic device 110 and maintain the cover 100 closed. The magnets can be wholly embedded within the cover 100 or a surface of the magnets can be exposed.

Figure 4:
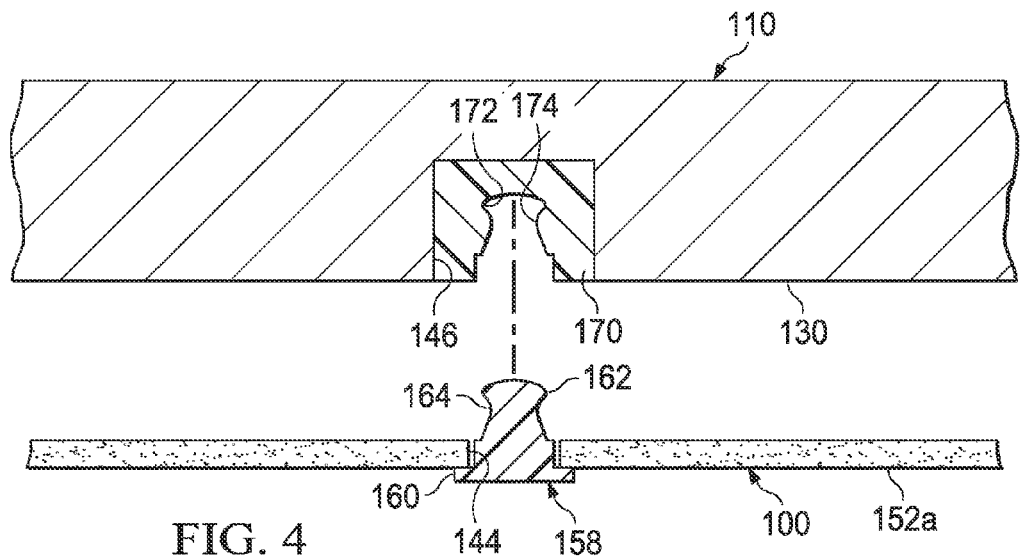
FIG. 4 is a detail side cross-sectional view of the cover of FIG. 1 and a mobile electronic device showing a snap for attaching the cover to the mobile electronic device.

FIG. 4 is a detail side cross-sectional view of the cover 100 and mobile electronic device 110 showing details of an example male/female connector. In this example, the cover 100 incorporates a male part 158 of the male/female connector that protrudes outward from the surface of the cover 100. The male part 158 can be integrally formed into the cover 100, or as shown in the figure, the male part 158 can be formed as an insert that itself is received in an aperture 144 in the cover and has a flange portion 160 that abuts the remainder of the cover 100. The mobile electronic device 110 includes a female part 170 of the male/female connector that internally receives and grips the male part 158. The female part 170 is in the back panel 130 of the device 110. In certain instances, the female part 170 can be formed integrally with the back panel 130, or as is shown in the figure, formed as an insert that itself is received in a holder 146 formed in the back panel 130.

The male/female connector can be configured as a snap. To this end, the male part 158 has a small diameter section 164 at its middle and a larger diameter section 162 at its tip. The female part 170, correspondingly, has an internal profile with a small diameter section 174 at its middle and a larger diameter section 172 near its base. When attaching the cover 100 to the mobile electronic device 110, the larger diameter section 162 of the male part 158 is passed through the smaller diameter section 174 of the female part 170, and the male part 158 and/or the female part 170 are radially, elastically deformed to allow passage. Once the larger diameter section 162 of the male part 158 is past the smaller diameter section 174 of the female part 170, the smaller diameter section 174 of the female part 170 nests with the smaller diameter part 164 of the male part 158 and grips the male part 158. The smaller diameter parts 164 and 174 are curved so that, when snapped, the cover 100 is held tight against and abutting the back panel 130 of the mobile electronic device 110 with the first section 152*a* flush and/or parallel (substantially or precisely) to the back panel 130. Notably, although discussed with part 158 on the cover 100 being male and the part 170 on the mobile electronic device 110 being female, in other instances, the part 158 could be female and the part 170 could be male.

As noted above, the cover 100 can be manipulated into different shapes to prop the mobile electronic device 110 at different viewing angles. Notably, none of the shapes require magnets or additional fasteners to attain. FIG. 2 shows the cover 100 open, with the mobile electronic device 110 propped in a near upright position (i.e., the smallest angle with the supporting surface is greater than 45 degrees). An edge of the mobile electronic device 110 rests in and is frictionally retained by the recess defined by web 154*c* between third and fourth rigid sections 152*c*, 152*d*. The second rigid section 152*b* is at an acute angle to the third and fourth rigid sections 152*c*, 152*d* (which are parallel, substantially or precisely, to the supporting surface), with the web 154*a* against or adjacent the back panel 130 of the device 110 to support the device 110 near upright. The web 154*a* is held against or adjacent the back panel 130, because the first rigid section 152*a* is attached flush and/or parallel to the back panel 130.

FIG. 5 shows the cover 100 open, with the mobile electronic device 110 propped at a shallow angle to the supporting surface (i.e., the smallest angle with the supporting surface is less than 45 degrees), for example, to facilitate on-screen typing on the mobile electronic device 110. The fourth rigid section 152*d* is parallel to (substantially or precisely) and abuts the back panel 130, with an edge wedged between and frictionally retained in place by the first rigid section 152*a* and the back panel 130. The second and third rigid sections 152*c* and 152*b* cooperate to define a triangular shape that supports the device 110 at the shallow angle. FIG. 6 shows the cover 100 in the same folded configuration as FIG. 5, but with the mobile electronic device 110 standing near upright.

As will be apparent from the discussion above, the concepts herein encompass a mobile electronic device and cover that are attached with a male/female coupling. In certain instances, the coupling is a snap. The coupling provides a secure engagement of the cover to the device, and in certain instances, alignment of the cover with the device. Some configurations of the cover can have rigid sections that allow the cover to fold to prop the mobile electronic device at different viewing angles. The secure engagement provided by the male/female coupling can facilitate certain folded arrangements.

A number of embodiments have been described. Nevertheless, it will be understood that various modifications may be made. Accordingly, other embodiments are within the scope of the following claims.

What is claimed is:

1. A cover for a mobile electronic device, comprising:
   a body portion adapted to cover at least one face of the mobile electronic device and comprising a first rigid section hingedly coupled to a second ridged section, a third rigid section hingedly coupled to the second rigid section and positioned relative to the second rigid section to cover at least a portion of an opposing face of the mobile electronic device, and a fourth rigid section hingedly coupled to the third rigid section and sized, together with the third rigid section, to cover a portion of an opposing face of the mobile electronic device;

a part of a male/female coupling carried by the first rigid section that mates with a corresponding part of the male/female coupling carried by the mobile electronic device and cooperates with the corresponding part to attach the cover to the mobile electronic device; and where the sections are foldable such that, with the first rigid section held to the face of the mobile electronic device with the male/female coupling, the fourth rigid section is parallel to and abutting the face of the mobile electronic device, an edge of the fourth rigid section wedged between the first rigid section and the face of the mobile electronic device, and the second and third rigid sections cooperating to define a triangular shape.

2. The cover of claim 1, where the part of the male/female coupling carried by the body portion comprises a male part that protrudes outward from a surface of the body portion to be received in a female part of the part of the male/female coupling carried by the mobile electronic device.

3. The cover of claim 1, further comprising a part of a second male/female coupling carried by the body portion and spaced from the first mentioned male/female coupling.

4. The cover of claim 1, where the male/female coupling comprises a snap and the part of the male/female coupling carried by the body portion comprises a male part of the snap.

5. The cover of claim 1, where a first side of the body portion covers one face of the mobile device and a second side of the body portion covers an opposing face of the mobile electronic device.

6. The cover of claim 1, where the cover comprises a folio style cover.

7. The cover of claim 1, where the first rigid section and the second rigid section are sized to cover the face of the mobile electronic device.

8. The cover of claim 1, where the part of the male/female coupling carried by the first rigid section comprises a male part.

9. The cover of claim 8, further comprising a male part of a second male/female coupling carried by the first rigid section.

10. The cover of claim 1, where sections are hingedly coupled by webs of material between each of the sections.

11. A method of coupling a cover to a mobile electronic device, comprising:

receiving a part of a male/female coupling carried by the cover together with a part of a male/female coupling carried by the mobile electronic device;

holding the cover attached to the mobile electronic device with the male/female coupling;

where the cover comprises a first rigid section hingedly coupled to a second ridged section, a third rigid section hingedly coupled to the second rigid section, and a fourth rigid section hingedly coupled to the third rigid section; and where the method further comprises folding the fourth rigid section parallel to and abutting a face of the mobile electronic device with an edge of the fourth rigid section wedged between the first rigid section and the face of the mobile electronic device, and arranging the second and third rigid sections to define a triangular shape.

12. The method of claim 11, where the male/female coupling comprises a snap and the method further comprising holding a portion of the cover flush with a face of the mobile electronic device with the snap.

13. A system, comprising:

a mobile electronic device having a first part of a male/female coupling; and a cover sized to cover a face of the mobile electronic device and comprising:

a first rigid section;

a second ridged section hingedly coupled to the first rigid section;

a third rigid section hingedly coupled to the second rigid section and positioned relative to the second rigid section to cover at least a portion of an opposing face of the mobile electronic device;

a fourth rigid section hingedly coupled to the third rigid section and sized, together with the third rigid section, to cover a portion of an opposing face of the mobile electronic device;

a part of a male/female coupling carried by the first rigid section that mates with the first part of the male/female coupling of the mobile electronic device and cooperates with the first part to attach the cover to the mobile electronic device; and where the sections are foldable such that, with the first rigid section held to the face of the mobile electronic device with the male/female coupling, the fourth rigid section is parallel to and abutting the face of the mobile electronic device, an edge of the fourth rigid section wedged between the first rigid section and the face of the mobile electronic device, and the second and third rigid sections cooperating to define a triangular shape.

14. The system of claim 13, where the male/female coupling comprises a snap and the cover has a male part of the snap.

* * * * *

UNITED STATES PATENT AND TRADEMARK OFFICE
CERTIFICATE OF CORRECTION

| | |
|---|---|
| PATENT NO. | : 8,724,300 B2 |
| APPLICATION NO. | : 13/404444 |
| DATED | : May 13, 2014 |
| INVENTOR(S) | : Dustin Jonathan Smith et al. |

It is certified that error appears in the above-identified patent and that said Letters Patent is hereby corrected as shown below:

In the Claims:

In Column 5, In Line 23, In Claim 2, after "the" delete "part of the".

Signed and Sealed this
Thirtieth Day of September, 2014

Michelle K. Lee
*Deputy Director of the United States Patent and Trademark Office*